US012614992B2

(12) United States Patent
Taniguchi et al.

(10) Patent No.: US 12,614,992 B2
(45) Date of Patent: Apr. 28, 2026

(54) INVERTER CONTROL APPARATUS AND POWER CONVERSION APPARATUS

(71) Applicant: HITACHI, LTD., Tokyo (JP)

(72) Inventors: Hitoshi Taniguchi, Tokyo (JP); Jia Li, Tokyo (JP); Aya Tooyama, Tokyo (JP); Takafumi Hara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 212 days.

(21) Appl. No.: 18/285,290

(22) PCT Filed: Apr. 11, 2022

(86) PCT No.: PCT/JP2022/017493
§ 371 (c)(1),
(2) Date: Oct. 2, 2023

(87) PCT Pub. No.: WO2022/239586
PCT Pub. Date: Nov. 17, 2022

(65) Prior Publication Data
US 2024/0364233 A1     Oct. 31, 2024

(30) Foreign Application Priority Data

May 12, 2021   (JP) ................................. 2021-081183

(51) Int. Cl.
H02M 7/537 (2006.01)
H02M 1/14 (2006.01)
(52) U.S. Cl.
CPC ............. H02M 7/537 (2013.01); H02M 1/14 (2013.01)
(58) Field of Classification Search
CPC .... H02M 7/537; H02M 1/14; H02M 7/53875; H02M 7/5395; H02M 7/48; H02M 1/38; Y02T 10/72
See application file for complete search history.

(56) References Cited

U.S. PATENT DOCUMENTS 8,525,466 B2 *   9/2013   Takaki ............. H02M 7/53875
                                                318/599
10,862,404 B2 *  12/2020  Takahashi ........... G01R 19/003
(Continued)

FOREIGN PATENT DOCUMENTS

JP        2005-51959 A       2/2005
JP        2005051959 A  *   2/2005
(Continued)

OTHER PUBLICATIONS

International Search Report of PCT/JP2022/017493 dated Jun. 21, 2022.

*Primary Examiner* — Monica Lewis
(74) *Attorney, Agent, or Firm* — MATTINGLY & MALUR, PC

(57) ABSTRACT

An inverter control apparatus includes: a voltage command generating unit that generates a voltage command corresponding to each phase of AC power; a phase difference calculation unit that calculates a voltage difference between the phases of the voltage command; a required phase difference calculation unit that calculates a required phase difference representing a difference of voltages between the phases of the voltage command required to prevent semiconductor switching devices from turning on simultaneously in two phases; a voltage command correction unit that compares the calculated voltage difference and the calculated required phase difference calculated, and corrects the voltage command based on the comparison result; a carrier wave generating unit that generates a carrier wave; and a PWM signal generating unit that compares the voltage command that has been corrected by the voltage command correction unit with the carrier wave.

7 Claims, 12 Drawing Sheets

(56)                  References Cited

U.S. PATENT DOCUMENTS

| 11,290,003 B2 * | 3/2022 | Tsuruma | ........... | H02M 7/53871 |
| 2018/0019697 A1 * | 1/2018 | Myoen | ................... | H02P 27/06 |

FOREIGN PATENT DOCUMENTS

| JP | 2016208664 A | * | 12/2016 | | |
| WO | WO-2022149207 A1 | * | 7/2022 | ........ | H02M 7/53873 |

* cited by examiner

(a) TWO PHASES TURN
ON SIMULTANEOUSLY (b) TWO PHASES TURN
ON AT DIFFERENT TIMINGS

FIG. 8
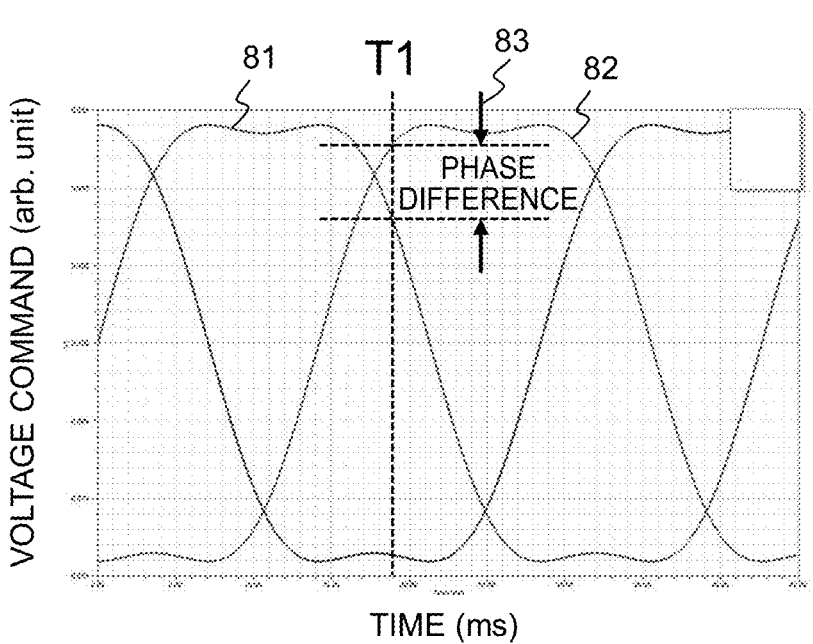
(a) VOLTAGE COMMAND PHASE DIFFERENCE
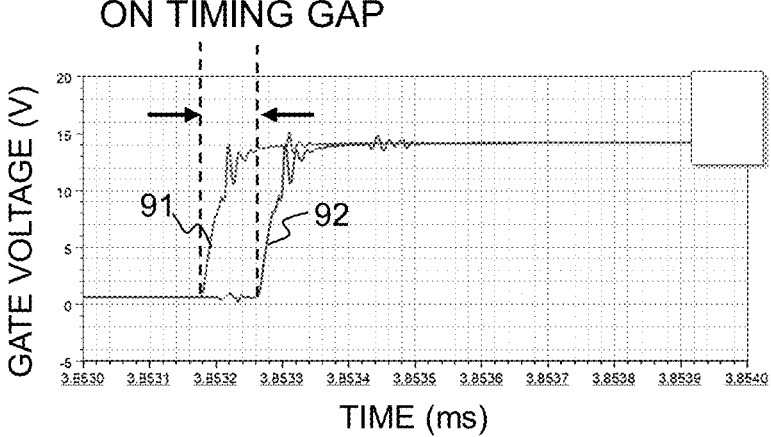
(b) GATE VOLTAGE TIME LAG

FIG. 10
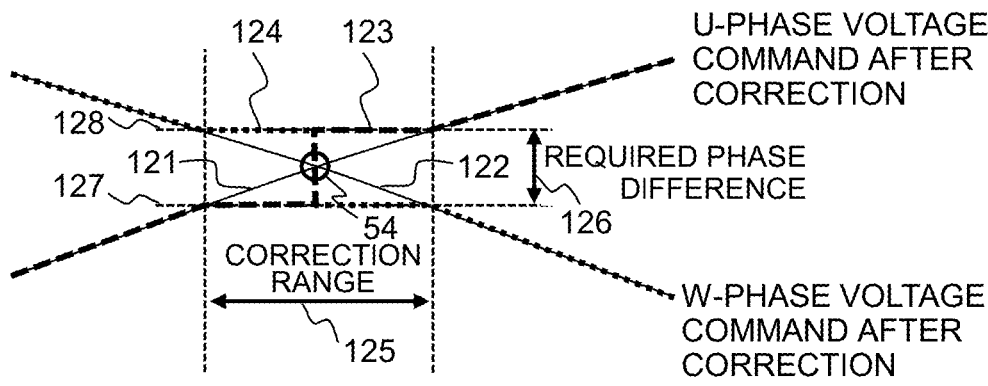
(a) VOLTAGE COMMAND BEFORE
AND AFTER CORRECTION
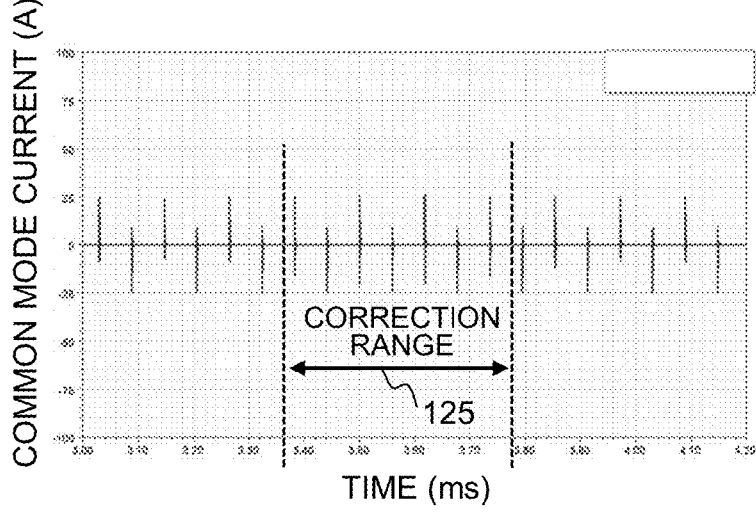
(b) COMMON MODE NOISE CURRENT

FIG. 11

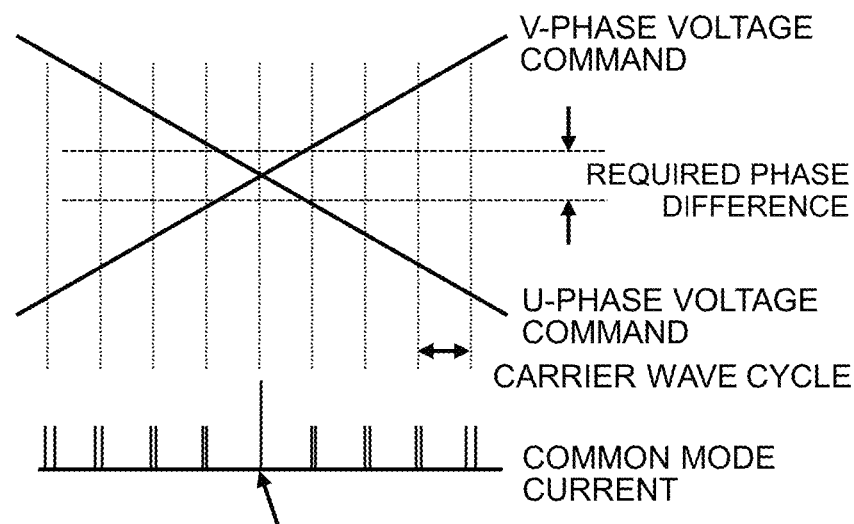

V-PHASE VOLTAGE COMMAND

REQUIRED PHASE DIFFERENCE

U-PHASE VOLTAGE COMMAND

CARRIER WAVE CYCLE

COMMON MODE CURRENT

WHEN VOLTAGE DIFFERENCE BETWEEN TWO PHASES IS EQUAL TO OR SMALLER THAN REQUIRED PHASE DIFFERENCE, TWO PHASES TURN ON SIMULTANEOUSLY, IN WHICH CASE NOISE DOUBLES (a) HIGH-SPEED DRIVING

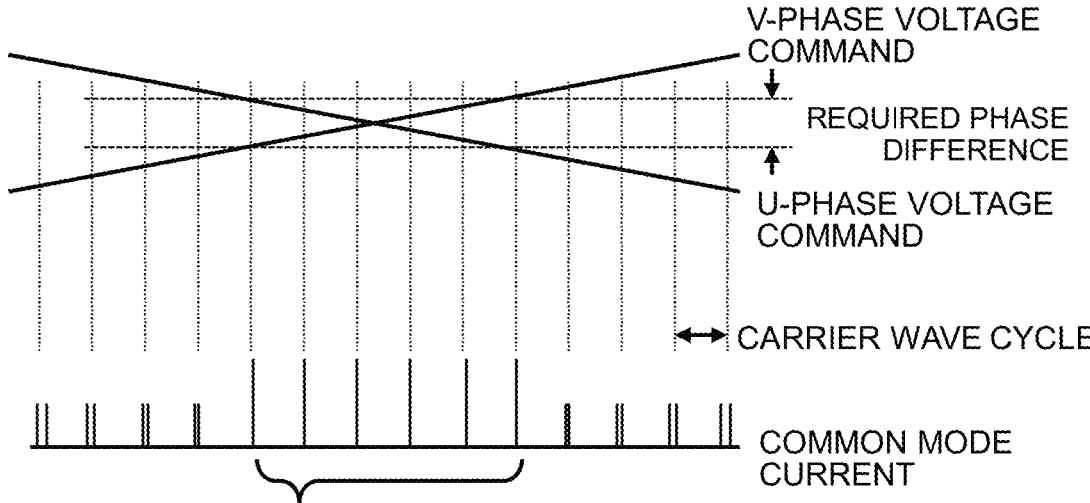

V-PHASE VOLTAGE COMMAND

REQUIRED PHASE DIFFERENCE

U-PHASE VOLTAGE COMMAND

CARRIER WAVE CYCLE

COMMON MODE CURRENT

WHEN VOLTAGE DIFFERENCE BETWEEN TWO PHASES IS EQUAL TO OR SMALLER THAN REQUIRED PHASE DIFFERENCE, TWO PHASES TURN ON SIMULTANEOUSLY, IN WHICH CASE NOISE DOUBLES (b) CREEP DRIVING

FIG. 12

FIG. 13
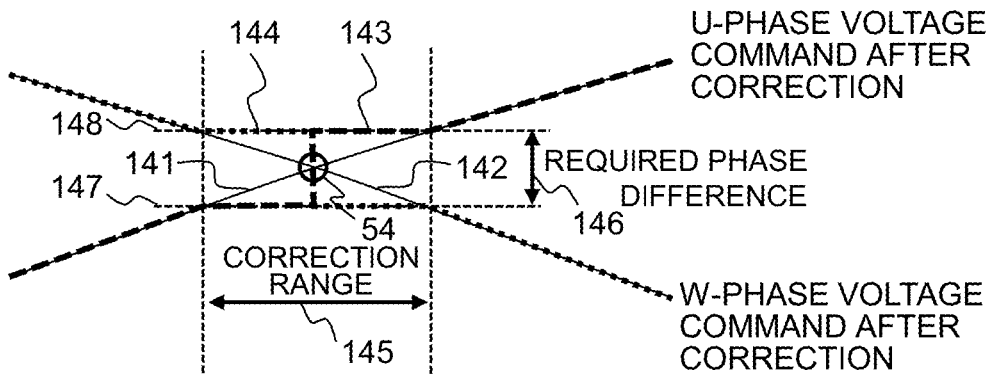
(a) VOLTAGE COMMAND BEFORE AND AFTER CORRECTION
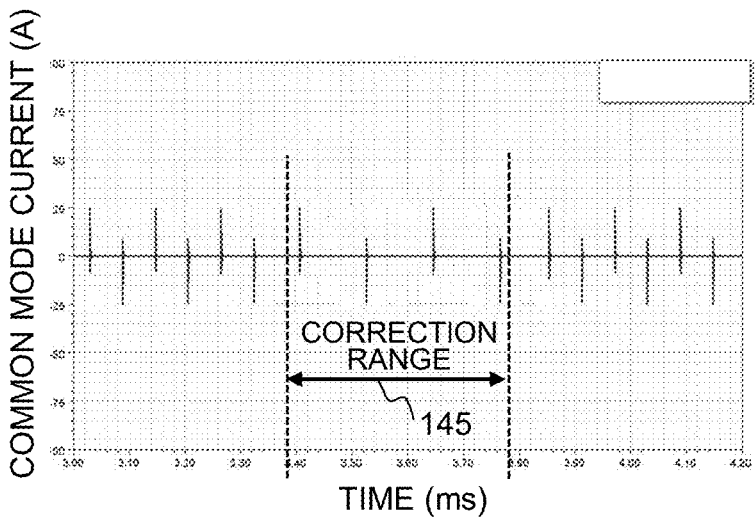
(b) COMMON MODE NOISE CURRENT

INVERTER CONTROL APPARATUS AND POWER CONVERSION APPARATUS

TECHNICAL FIELD

The present invention relates to an inverter control apparatus and a power conversion apparatus including the same.

BACKGROUND ART

In recent years, in order to comply with regulations on fuel consumption environment and exhaust emissions, automobiles (including hybrid vehicles, plug-in hybrid vehicles, and electric vehicles) equipped with AC motors for driving vehicles and running with the torque generated by the AC motors have become increasingly popular. Such vehicles are generally equipped with a power conversion apparatus composed of semiconductor switching devices to convert DC power output from a battery into AC power and supply it to the AC motor.

In power conversion apparatuses, noise current is generated by the high-speed switching operation of semiconductor switching devices, which may adversely affect other electronic devices. The challenge is therefore to suppress noise current. As related art made to achieve this challenge, there is, for example, Patent Literature 1. Patent Literature 1 discloses a technique to detect whether two or more pulse width modulation signals show that they fluctuate in the same direction simultaneously, and when it is determined that they fluctuate in that manner, shift the phases of the pulse width modulation signals from one another so that the semiconductor switching devices are turned on and off, thereby preventing the potentials of a plurality of output terminals of a power conversion apparatus from fluctuating in the same direction simultaneously.

CITATION LIST

Patent Literature

Patent Literature 1: Japanese Patent Laid-Open No. 2005-51959

SUMMARY OF INVENTION

Technical Problem

In a power conversion apparatus capable of outputting multi-phase AC power by switching operation of a plurality of semiconductor switching devices separately, the period during which the semiconductor switching devices of different phases are turned on simultaneously varies depending on the rotation speed and output torque of the motor. For example, when both the motor speed and output torque are low, such as during creep driving of a vehicle, both the fundamental frequency and amplitude of the voltage command to the power conversion apparatus are low, thereby increasing the proportion of the periods when the semiconductor switching devices of the different phases are turned on simultaneously. However, the technology of Patent Literature 1 does not specifically take this point into consideration, and hardly completely prevents the semiconductor switching devices of different phases from being turned on simultaneously. In addition, in order to apply the technique of Patent Literature 1, it is necessary to provide a circuit to detect two or more pulse width modulation signals fluctuating in the same direction simultaneously and also a delay circuit to shift the phase of the pulse width modulation signals, which results in increased costs. Furthermore, when the phase of the pulse width modulation signal is shifted, it is difficult to ensure signal continuity and control response before and after the shift. This leaves room for further improvement in the suppression of noise current.

In view of the aforementioned problem, an object of the present invention is to effectively suppress noise current generated in power conversion apparatuses.

Solution to Problem

An inverter control apparatus according to the present invention, which is an apparatus that controls an inverter having a plurality of semiconductor switching devices and converting DC power into multi-phase AC power by switching the plurality of semiconductor switching devices separately, comprises: a voltage command generating unit that generates a voltage command corresponding to each phase of the AC power; a phase difference calculation unit that calculates a voltage difference between the phases of the voltage command; a required phase difference calculation unit that calculates a required phase difference representing a difference of voltages between the phases of the voltage command required to prevent the semiconductor switching devices from turning on simultaneously in two phases; a voltage command correction unit that compares the voltage difference calculated by the phase difference calculation unit and the required phase difference calculated by the required phase difference calculation unit, and corrects the voltage command based on the comparison result; a carrier wave generating unit that generates a carrier wave; and a PWM signal generating unit that compares the voltage command that has been corrected by the voltage command correction unit with the carrier wave, thereby generating a PWM signal used to control the inverter.

A power conversion apparatus according to the present invention comprises: the above inverter control apparatus; the inverter controlled by the inverter control apparatus; and a smoothing capacitor that smooths the DC power input from a power source to the inverter.

Advantageous Effect of Invention

According to the present invention, noise current generated in power conversion apparatuses can be effectively suppressed.

BRIEF DESCRIPTION OF DRAWINGS

FIG. 2 is a diagram for explaining inverter noise.

FIG. 3 is a functional block diagram of an inverter control apparatus according to a first embodiment of the present invention.

FIG. 4 is a functional block diagram of a PWM arithmetic unit according to the first embodiment of the present invention.

FIG. 6 is a diagram for explaining the increase in common mode current due to simultaneous two-phase turn-on.

FIG. 8 is a diagram for explaining the relationship between the voltage command phase difference and gate voltage shift.

FIG. 10 is a diagram showing the relationship between voltage command correction and effect of suppression of common mode noise current according to the first embodiment of the present invention.

FIG. 11 is a diagram showing the relationship between the running state of an electric vehicle and common mode noise current.

FIG. 12 is a functional block diagram of a PWM arithmetic unit according to a second embodiment of the present invention.

FIG. 13 is a diagram showing the relationship between voltage command correction and the suppression of common mode noise current according to the second embodiment of the present invention.

DESCRIPTION OF EMBODIMENTS

Figure 1:
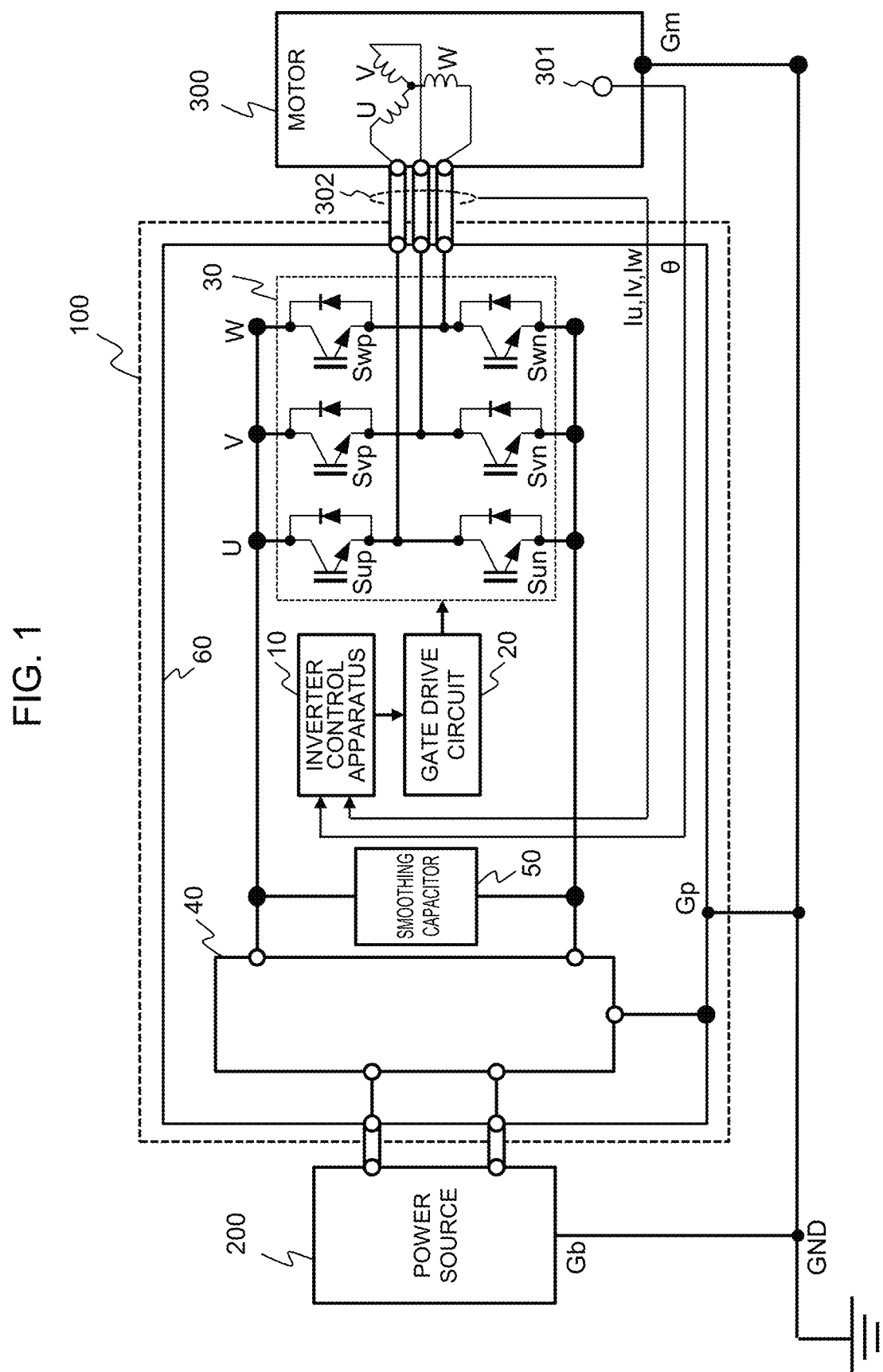
FIG. 1 is a configuration diagram of a motor drive system including a power conversion apparatus according to one embodiment of the present invention.

The embodiments of the present invention will now be described with reference to the accompanying drawings. The following description and drawings are illustrative examples to explain the present invention, and involve omission or simplification as appropriate for clarification of explanation. The present invention can also be implemented in various other forms. Unless otherwise limited, each component can be singular or plural.

The position, size, shape, extent, and the like of each component shown in the drawings do not necessarily represent the actual position, size, shape, extent, and the like, in order to facilitate understanding of the present invention. Therefore, the present invention is not necessarily limited to the position, size, shape, extent, and the like disclosed in the drawings.

When there are a plurality of components having the same or similar functions, they may be described using the same reference numeral with different subscripts. However, when there is no need to distinguish between the plurality of components, the subscripts may be omitted.

The following description may include processing performed by executing a program, and the processing may be mainly performed in a processor because the program is executed by a processor (e.g., CPU or GPU) to perform determined processing while using a storage resource (e.g., memory) and/or an interface device (e.g., communication port) as appropriate. Similarly, the processing performed by executing a program may be mainly performed in a controller, apparatus, system, computer, or node having a processor. The processing performed by executing the program may be mainly performed in an arithmetic unit which may include a dedicated circuit (e.g., FPGA or ASIC) that performs specific processing.

The program may be installed on an apparatus such as a computer from a program source. The program source may be, for example, a program distribution server or a storage medium readable by a computer. If the program source is a program distribution server, the program distribution server may include a processor and a storage resource that stores the distribution target program, and the processor of the program distribution server may distribute the distribution target program to other computers. In the following description, two or more programs may be implemented as one program, or one program may be implemented as two or more programs.

First Embodiment

The first embodiment of the present invention will be described below with reference to the accompanying drawings. FIG. 1 is a configuration diagram of a motor drive system including a power conversion apparatus according to one embodiment of the present invention.

The motor drive system shown in FIG. 1 consists of a power conversion apparatus 100, a power source 200, and a motor 300 connected to each other. The power conversion apparatus 100 is connected to the power source 200 via a DC cable and to the motor 300 via an AC cable. The motor drive system is installed in an electric vehicle, such as an electric vehicle or a hybrid vehicle, for example, and is used to drive the electric vehicle using the motor 300 as a drive source.

The power source 200 is a DC power source that supplies DC power to the power conversion apparatus 100. For example, in a motor drive system installed in electric vehicles such as electric cars and hybrid cars, a high-voltage battery of several hundred volts, consisting of a number of secondary batteries such as lithium-ion batteries connected together, can be used as the power source 200. In motor drive systems used in medical apparatuses such as X-ray diagnostic apparatuses, for example, the power source 200 can be obtained by converting a commercial AC power source into a DC power source using a rectifier circuit or converter.

In the motor 300, an unshown rotor is driven to rotate with current flowing in the coils of different phases provided in an unshown stator in response to AC power output from the power conversion apparatus 100. As a result, the motor 300 acts as a load for the power conversion apparatus 100.

The power conversion apparatus 100, power source 200, and motor 300 have ground connection points Gp, Gb, and Gm for frame ground, respectively. These connection points are electrically grounded through a common ground wire.

The power conversion apparatus 100 has a noise filter 40, which is a DC filter for reducing common mode noise current superimposed on DC current input from the power source 200. It also has an inverter control apparatus 10, a gate drive circuit 20, an inverter 30, a smoothing capacitor 50, and an enclosure 60.

The enclosure 60 is a metal case that houses the components of the power conversion apparatus 100. FIG. 1 only show parts of the circuits and elements stored in the enclosure 60 that are necessary for the description of the motor drive system according to this embodiment. The enclosure 60 is electrically connected to the aforementioned ground wire at the ground connection point Gp and is used as a frame ground for the power conversion apparatus 100. The noise filter 40 is electrically grounded by being connected to the enclosure 60.

The inverter 30 is connected to the power source 200 via a noise filter 40. The smoothing capacitor 50 is connected in parallel with the inverter 30 and smooths the DC power input from the power source 200 to the inverter 30. The inverter 30 is a power module composed of semiconductor switching devices Sup, Sun, Sbp, Svn, Swp, and Swn such as IGBT, MOSFET, SiC, and GaN, and power conversion from DC power to AC power is performed by switching these semiconductor switching devices according to the control by the inverter control apparatus 10. The AC power generated by this power conversion operation is output from the inverter 30 to the motor 300.

A current sensor 302 is located in the current path between the inverter 30 and the motor 300. The current sensor 302 detects three-phase AC currents Iu, Iv, and Iw (U-phase AC current Iu, V-phase AC current Iv, and W-phase AC current Iw) that energize the motor 300. The current sensor 302 is, for example, a Hall current sensor. The detection results of the three-phase AC currents Iu, Iv, and Iw given by the current sensor 302 are input to the inverter control apparatus 10 and used for PWM signal generation by the inverter control apparatus 10. The AC currents for two of the three-phase AC currents Iu, Iv, and Iw may be detected by the current sensor 302, and the AC current for the remaining one may be calculated from the sum of the three-phase AC currents Iu, Iv, and Iw, which is zero. The pulse-shaped DC current flowing from the power source 200 to the inverter 30 may be detected by a shunt resistor or the like located between the smoothing capacitor 50 and the inverter 30, and the three-phase AC currents Iu, Iv, and Iw may be calculated based on that DC current and the three-phase AC voltages Vu, Vv, and Vw applied to the motor 300 from the inverter 30.

The motor 300 is equipped with a rotational position sensor 301 for detecting the rotational position θ of the rotor. The power conversion apparatus 100 calculates the rotational position θ of the rotor based on the detection signal from the rotational position sensor 301. Although a resolver consisting of an iron core and windings is more suitable for the rotational position sensor 301, a magnetoresistive element such as a GMR sensor or a sensor using a Hall element is also acceptable. Any sensor can be used as the rotational position sensor 301 as long as it can measure the magnetic pole position of the rotor. Alternatively, the rotational position θ can be estimated using the three-phase AC currents Iu, Iv, and Iw flowing in the motor 300 and the three-phase AC voltages Vu, Vv, and Vw applied to the motor 300, without using the detection signal from the rotational position sensor 301.

The inverter control apparatus 10 generates pulse width modulation signals (PWM signals) for switching each semiconductor switching device of the inverter 30 by executing a predetermined calculation process based on the three-phase AC currents Iu, Iv, Iw and rotational position θ. The PWM signal generated by the inverter control apparatus 10 is output to the inverter 30 via the gate drive circuit 20 and is input to the gate terminals of the semiconductor switching devices Sup, Sun, Sbp, Svn, Swp, and Swn, respectively. This controls the switching of each semiconductor switching device.

The inverter control apparatus 10 controls the operation of the inverter 30 by outputting PWM signals to the semiconductor switching devices of the inverter 30 via the gate drive circuit 20 as described above. Consequently, the voltage and current of the AC power output from the power conversion apparatus 100 to the motor 300 can be controlled. The inverter control apparatus 10 is composed of, for example, a microcomputer, and controls the operation of the inverter 30 by executing a predetermined program in the microcomputer. Alternatively, the operation of the inverter 30 may be controlled by the inverter control apparatus 10, using an integrated circuit such as an LSI, FPGA, or ASIC.

Figure 2:
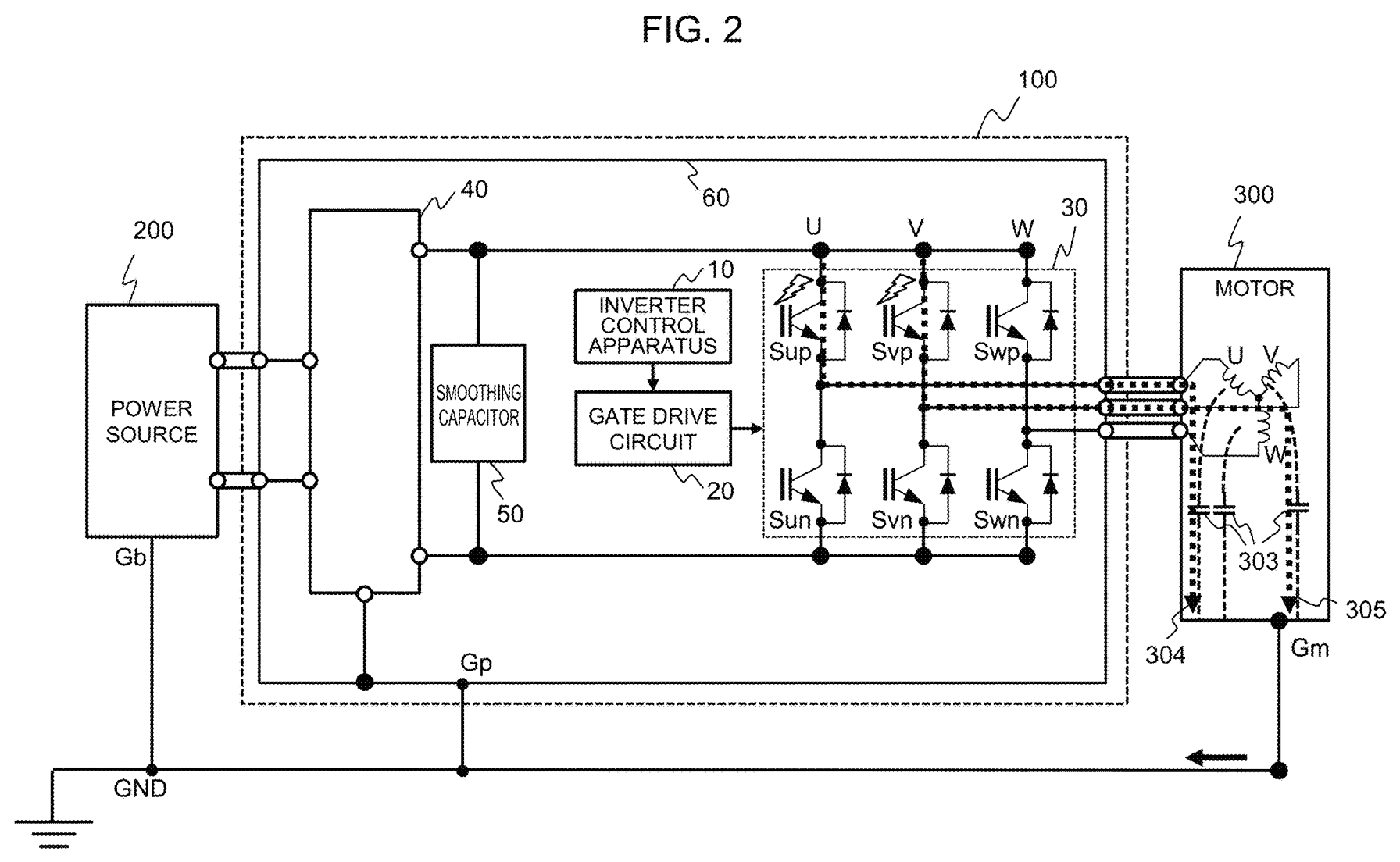

Inverter noise generated by the operation of the inverter 30 in the motor drive system 1 will now be explained with reference to FIG. 2.

When the semiconductor switching devices of the inverter 30 are switched according to the control by the inverter control apparatus 10, three-phase alternating current flows from the inverter 30 to the motor 300. At this time, the inrush current that flows according to the timing when each semiconductor switching device is switched from off to on flows to the frame ground through a parasitic capacitor 303 formed between each coil of the corresponding phase and the enclosure in the motor 300, resulting in common mode noise current. In particular, as shown in FIG. 2, when the timings when the semiconductor switching devices for two phases are turned on in the inverter 30 coincide, the inrush current flowing in the motor 300 doubles compared to when the semiconductor switching devices for all the phases are turned on individually. As a result, the common mode noise current also doubles. The example in FIG. 2 shows the paths 304 and 305 of the inrush current that flows when the semiconductor switching device Sup corresponding to the U-phase upper arm and the semiconductor switching device Svp corresponding to the V-phase upper arm are turned on simultaneously, but the same applies to other phase combinations.

The common mode noise current generated in the motor drive system 1 is superimposed on the AC current and the like flowing through the inverter 30 and motor 300, causing high-frequency radiated noise. This radiated noise has to be suppressed as much as possible because it may have adverse effects on other apparatuses and the like placed around the motor drive system 1. In recent years, in particular, as electromagnetic compatibility (EMC) standards have become stricter, there is a strong need to reduce common-mode noise current.

Therefore, the present invention adjusts the PWM signals output to the semiconductor switching devices in the inverter control apparatus 10 so that semiconductor switching devices of two or more phases do not turn on simultaneously. This suppresses an increase in common mode noise current. The following will explain the specific method.

Figure 3:
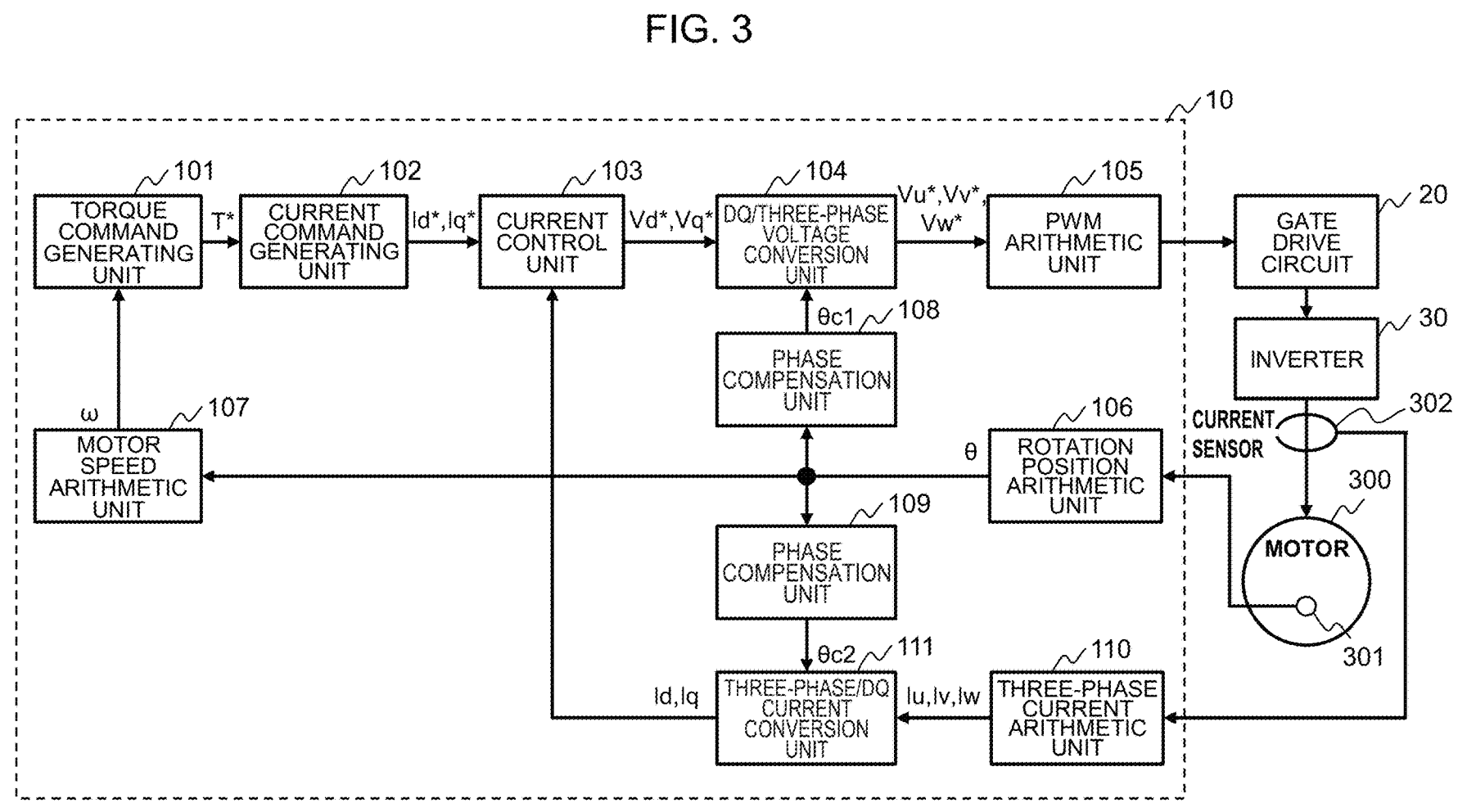

FIG. 3 shows a functional block diagram of the inverter control apparatus 10 according to the first embodiment of the present invention. The inverter control apparatus 10 in this embodiment has the following functional blocks: a torque command generating unit 101, a current command generating unit 102, a current control unit 103, a dq/three-phase voltage conversion unit 104, a PWM arithmetic unit 105, a rotational position arithmetic unit 106, a motor speed arithmetic unit 107, phase compensation units 108 and 109, a three-phase current arithmetic unit 110, and a three-phase/dq current conversion unit 111. The inverter control apparatus 10 is composed of, for example, a microcomputer, and these functional blocks can be implemented by executing a predetermined program in the microcomputer. Alternatively, some or all of these functional blocks may be implemented using hardware circuits such as logic ICs or FPGAS.

The torque command generating unit 101 generates a torque command T* for the motor 300 based on the rotation speed ω of the motor 300 input from the motor speed arithmetic unit 107. In addition to the rotation speed ω, the torque command generating unit 101 can generate the torque command T* using, for example, the accelerator opening degree and the DC voltage of the power source 200.

The current command generating unit 102 generates a d-axis current command Id* and q-axis current command Iq* based on the torque command T* generated by the torque command generating unit 101, using the motor torque relationship formula or map.

The current control unit 103 calculates the d-axis voltage command Vd* and q-axis voltage command Vq* so that the d-axis current command Id* and q-axis current command Iq* generated by the current command generating unit 102 coincide the d-axis current detection value Id and q-axis current detection value Iq input from a three-phase/dq current conversion unit 12, respectively.

The dq/three-phase voltage conversion unit 104 calculates the U-phase voltage command value Vu*, V-phase voltage command value Vv*, and W-phase voltage command value Vw*, which are three-phase voltage command values that are UVW-converted from the d-axis voltage command Vd* and q-axis voltage command Vq* based on the rotational position θc1 after phase compensation input from a phase compensation unit 108.

The PWM arithmetic unit 105 generates a pulse-shaped voltage for each of the U-, V-, and W-phases based on the three-phase voltage command values (U-phase voltage command value Vu*, V-phase voltage command value Vv*, and W-phase voltage command value Vw*) obtained by the dq/three-phase voltage conversion unit 104. Then, based on the generated pulse-shaped voltages, a predetermined PWM operation is performed to generate PWM signals for the semiconductor switching devices of the phases of the inverter 30. At this time, PWM signals for the lower arm of each phase can be generated by inverting the PWM signals of the upper arm of the corresponding phase. The details of the PWM arithmetic unit 105 will be described below with reference to FIG. 4.

The PWM signal generated by the PWM arithmetic unit 105 is output from the inverter control apparatus 10 to the gate drive circuit 20, converted to a predetermined voltage signal by the gate drive circuit 20, and then output to the inverter 30. As a result, each semiconductor switching device of the inverter 30 is on/off controlled and the output voltage of the inverter 30 is adjusted.

The rotational position arithmetic unit 106 calculates rotational position θ, which indicates the position (angle) of the rotor of the motor 300, from the detection signal of the rotational position sensor 301.

The motor speed arithmetic unit 107 calculates the rotation speed (RPM) ω of the motor 300 from the rate of change of the rotation position θ with respect to time.

The phase compensation units 108 and 109 calculate the rotational positions θc1 and θc2 after phase compensation, respectively, by performing phase compensation for the rotational position θ, taking into account the delay time of calculation by the rotational position arithmetic unit 106. The phase-compensated rotational position θc1 obtained by the phase compensation unit 108 is input to the dq/three-phase voltage conversion unit 104, and the phase-compensated rotational position θc2 obtained by the phase compensation unit 109 is input to the three-phase/dq current conversion unit 111.

The three-phase current arithmetic unit 110 calculates the detection values of the three-phase AC currents Iu, Iv, and Iw from the detection signals obtained by the current sensor 302.

The three-phase/dq current conversion unit 111 calculates the d-axis current detection value Id and q-axis current detection value Iq obtained by dq-converting the detection values of the three-phase AC currents Iu, Iv, and Iw, based on the phase-compensated rotational position θc2 input from the phase compensation unit 109.

Figure 4:
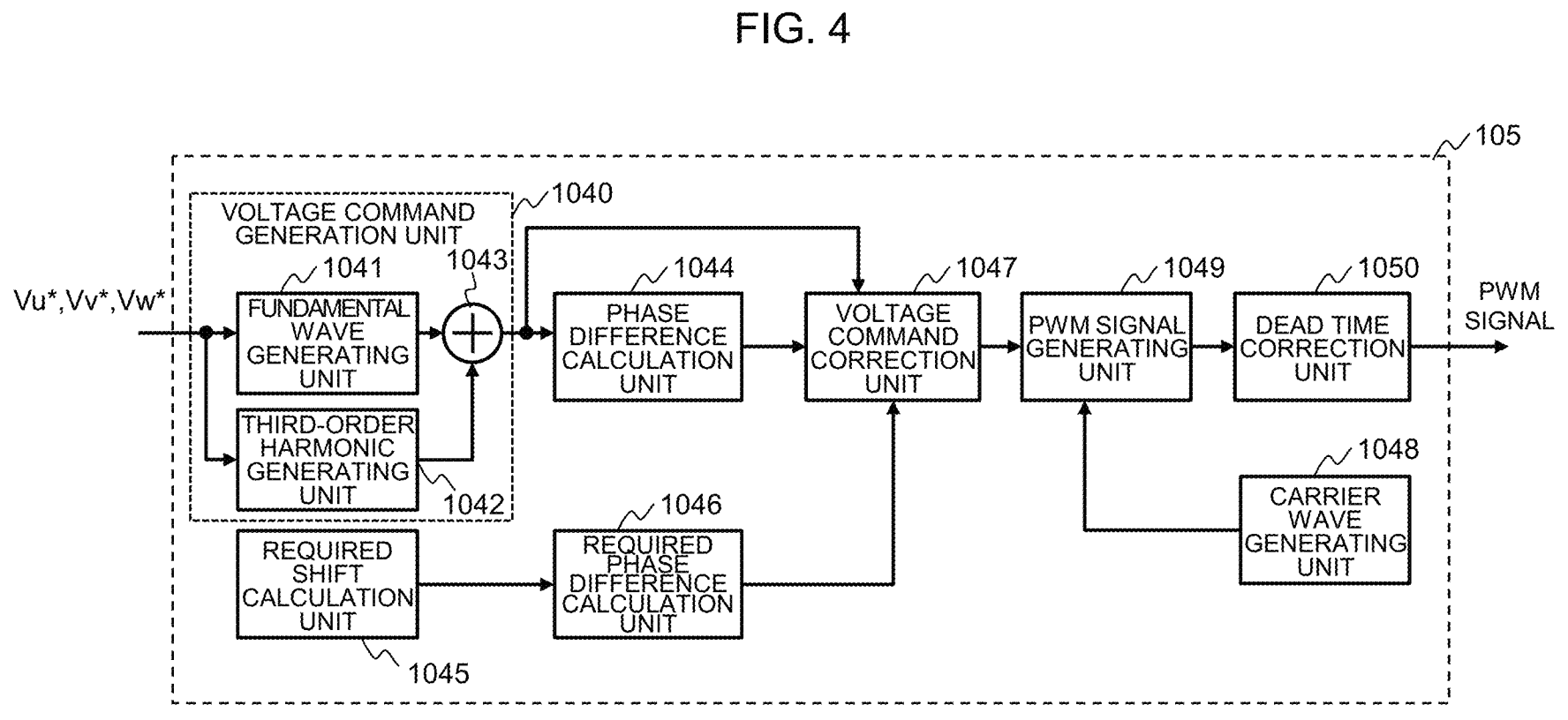

The details of the PWM arithmetic unit 105 will now be described below. FIG. 4 is a functional block diagram of the PWM arithmetic unit 105 according to the first embodiment of the present invention. The PWM arithmetic unit 105 of this embodiment includes the following functional blocks: a voltage command generating unit 1040, a phase difference calculation unit 1044, a required shift calculation unit 1045, a required phase difference calculation unit 1046, a voltage command correction unit 1047, a carrier wave generating unit 1048, a PWM signal generating unit 1049, and a dead time correction unit 1050.

The voltage command generating unit 1040 generates voltage commands corresponding to the phases of the AC power generated by power conversion of DC power in the inverter 30 based on the three-phase voltage command values Vu*, Vv*, and Vw* input from the dq/three-phase voltage conversion unit 104 in FIG. 3. The voltage command generating unit 1040 includes a fundamental wave generating unit 1041, a third-order harmonic generating unit 1042, and an adder unit 1043.

The fundamental wave generating unit 1041 generates the fundamental wave for each of the U, V, and W phases corresponding to the three-phase voltage command values Vu*, Vv*, and Vw*, respectively. Here, a sine wave based on the U-phase voltage command value Vu*, for example, is generated as the U-phase fundamental wave, to which phase differences of 120° and 240° electric angle are added to generate the V-phase and W-phase fundamental waves, respectively. Alternatively, the fundamental wave generating unit 1041 can be implemented using any generation method as long as it can generate a sine wave corresponding to the fundamental wave of each of the U, V, and W phases from the three-phase voltage command values Vu*, Vv*, and Vw*.

The third-order harmonic generating unit 1042 generates the third-order harmonics for the fundamental wave of each of the U, V, and W phases based on the three-phase voltage command values Vu*, Vv*, and Vw*.

For each of the U, V, and W phases, the adder unit 1043 adds the third-order harmonics generated by the third-order harmonic generating unit 1042 to the fundamental wave generated by the fundamental wave generating unit 1041, thereby generating a voltage command in which the third-order harmonics are superimposed on the sine wave. Consequently, a voltage command based on the three-phase voltage command values Vu*, Vv*, and Vw* is generated in the voltage command generating unit 1040.

Although FIG. 4 shows an example in which the voltage command generating unit 1040 is composed of the fundamental wave generating unit 1041, third-order harmonic generating unit 1042, and adder unit 1043, the configuration of the voltage command generating unit 1040 is not limited to this. For example, a voltage command in which third-order harmonics are not superimposed may be generated with the voltage command generating unit 1040 composed only of the fundamental wave generating unit 1041. Alternatively, a voltage command based on the three-phase voltage command values Vu*, Vv*, and Vw* may be generated using map information pre-stored in the voltage command generating unit 1040. Alternatively, the configuration of the voltage command generating unit 1040 can be defined so that voltage commands are generated from the three-phase voltage command values Vu*, Vv*, and Vw* by any method.

The phase difference calculation unit 1044 calculates the voltage difference in voltage command generated by the voltage command generating unit 1040 among the U, V, and W phases. Here, calculated are, for example, the UV phase difference representing the difference between the U-phase voltage command and the V-phase voltage command, the VW phase difference representing the difference between the V-phase voltage command and the W-phase voltage command, and the WU phase difference representing the difference between the W-phase voltage command and the U-phase voltage command.

The required shift calculation unit 1045 calculates the time difference between the phases of the voltage command required to prevent the semiconductor switching devices of the inverter 30 from turning on simultaneously in two phases. The details of the method of calculating the time difference with the required shift calculation unit 1045 will be described below. The calculation process in the required shift calculation unit 1045 may be omitted by inputting a predetermined value of time difference based on the measured value of common mode current obtained by experiments or the like in the required shift calculation unit 1045, holding it, and outputting that value from the required shift calculation unit 1045. In addition, in the case where the required shift calculation unit 1045 is unnecessary as described below, the required shift calculation unit 1045 may be deleted from the PWM arithmetic unit 105.

The required phase difference calculation unit 1046 calculates the required phase difference, which represents the difference between the phases of the voltage command required to prevent the semiconductor switching devices of the inverter 30 from turning on simultaneously in two phases, based on the time difference calculated by the required shift calculation unit 1045. The details of the method of calculating the required phase difference with the required phase difference calculation unit 1046 will be described below. The calculation process in the required phase difference calculation unit 1046 may be omitted by inputting a pre-calculated value of the required phase difference to the required phase difference calculation unit 1046, holding it, and outputting that value from the required phase difference calculation unit 1046. In this case, there is no need for the required phase difference calculation unit 1046 to calculate the required operation from the time difference calculated by the required shift calculation unit 1045. This eliminates the need for the required shift calculation unit 1045 in the PWM arithmetic unit 105.

The voltage command correction unit 1047 compares the voltage difference between each of the U, V, and W phases of the voltage command calculated by the phase difference calculation unit 1044 and the required phase difference calculated by the required phase difference calculation unit 1046, and corrects the voltage command generated by the voltage command generating unit 1040 based on the comparison result. Here, if the voltage difference between the phases of the voltage command is smaller than the required phase difference, the voltage command is corrected so that the voltage difference between the phases and the required phase difference substantially match. The voltage command that has been corrected by the voltage command correction unit 1047 is output from the voltage command correction unit 1047 as a corrected voltage command and is input to the PWM signal generating unit 1049.

If the voltage difference between the phases of the voltage command is equal to or larger than the required phase difference, the voltage command correction unit 1047 does not correct the voltage command and outputs the voltage command generated by the voltage command generating unit 1040 as it is as the corrected voltage command.

The carrier wave generating unit 1048 generates, for example, a triangular wave or sawtooth wave that varies continuously in a predetermined cycle as a carrier wave used to generate the PWM signal. The frequency of the carrier wave generated by the carrier wave generating unit 1048 may be varied according to the rotation speed ω of the motor 300 calculated by the motor speed arithmetic unit 107 in FIG. 3.

The PWM signal generating unit 1049 generates PWM signals for the semiconductor switching devices of the phases of the inverter 30 by performing the predetermined PWM operation on the corrected voltage command input from the voltage command correction unit 1047, using the carrier wave generated by the carrier wave generating unit 1048. At this time, the PWM signal generating unit 1049 compares the corrected voltage command with the carrier wave and generates a pulse-shaped PWM signal according to the result of the comparison, thereby generating a PWM signal with a pulse width corresponding to the corrected voltage command value.

The dead time correction unit 1050 performs a predetermined dead time correction on the PWM signal generated by the PWM signal generating unit 1049. The PWM signal that has undergone dead time correction by the dead time correction unit 1050 is output from the PWM arithmetic unit 105 to each semiconductor switching device of the inverter 30 via the gate drive circuit 20.

Next, the time difference and required phase difference calculated by the required shift calculation unit 1045 and the required phase difference calculation unit 1046, respectively, will be explained below with reference to FIGS. 5 to 9.

Figure 5:
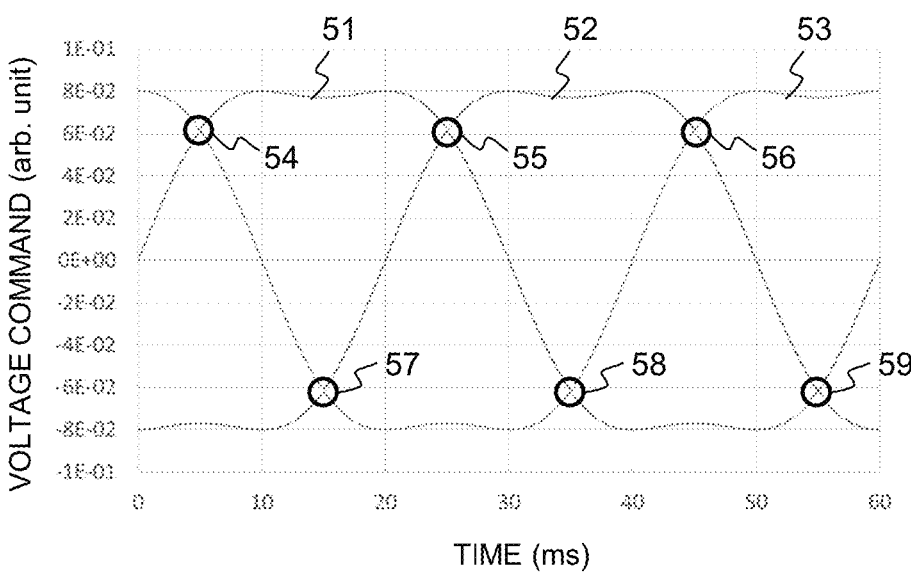
FIG. 5 is a diagram for explaining the timing when two phases turn on simultaneously.

FIG. 5 is a diagram for explaining the timing when two phases turn on simultaneously in semiconductor switching devices. In FIG. 5, the waveforms denoted by the reference numerals 51, 52, and 53 are examples of voltage command waveforms in the U, V, and W phases. In FIG. 5, the voltage command values of the phases are shown as relative values normalized by a predetermined reference value.

The points indicated by the circles denoted by the reference numerals 54 to 59 in FIG. 5 indicate the timings when the voltage command waveforms of any two of the three phases U, V, and W overlap. At these timings, simultaneous two-phase turn-on which is a phenomenon where semiconductor switching devices for two phases are turned on simultaneously occurs in the inverter 30.

To be specific, at the point 54 where the U-phase voltage command and the W-phase voltage command overlap, the semiconductor switching device Sup in the U-phase upper arm and the semiconductor switching device Swp in the W-phase upper arm turn on simultaneously. At the point 55 where the U-phase voltage command and the V-phase voltage command overlap, the semiconductor switching device Sup of the U-phase upper arm and the semiconductor switching device Svp of the V-phase upper arm turn on simultaneously. At the point 56 where the V-phase voltage command and the W-phase voltage command overlap, the semiconductor switching device Svp of the V-phase upper arm and the semiconductor switching device Swp of the W-phase upper arm turn on simultaneously.

At the point 57 where the V-phase voltage command and the W-phase voltage command overlap, the semiconductor switching device Svn of the V-phase lower arm and the semiconductor switching device Swn of the W-phase lower arm turn on simultaneously. At the point 58 where the U-phase voltage command and the W-phase voltage command overlap, the semiconductor switching device Sun of the U-phase lower arm and the semiconductor switching device Swn of the W-phase lower arm turn on simultaneously. At the point 59 where the U-phase voltage command and the V-phase voltage command overlap, the semiconductor switching device Sun of the U-phase lower arm and the semiconductor switching device Svn of the V-phase upper arm turn on simultaneously.

Figure 6:
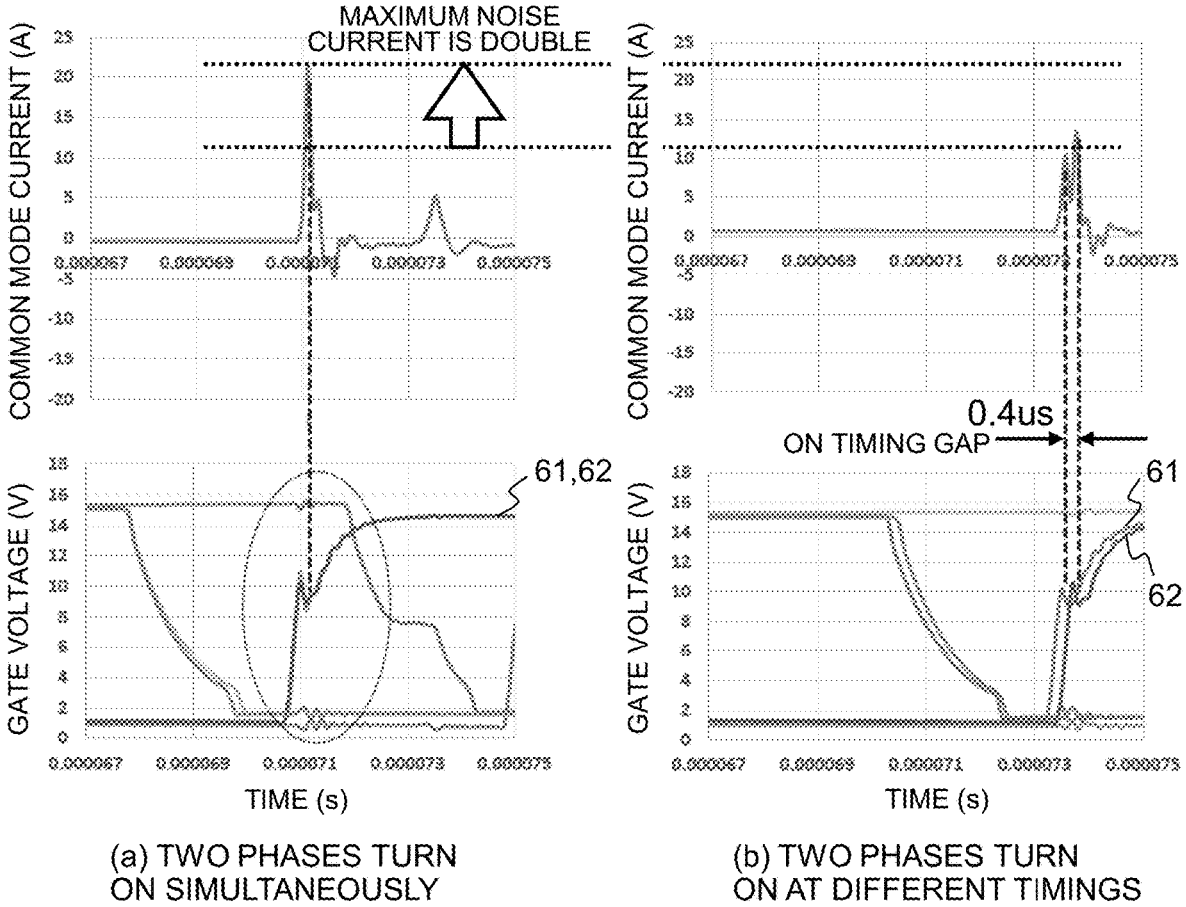

FIG. 6 is a diagram for explaining the increase in common mode current due to simultaneous two-phase turn-on. FIG. 6(a) shows the relationship between gate voltage and common mode current observed during simultaneous two-phase turn-on. In the graph shown in the lower section of FIG. 6(a), the gate voltages indicated by the reference numerals 61 and 62 are examples of the gate voltages of the semiconductor switching devices that constitute either the upper or lower arm in the two phases. When these gate voltages exceed their respective predetermined thresholds at the same time, the semiconductor switching devices in the two phases are turned on simultaneously, generating the common mode currents as shown in the upper section of FIG. 6(a).

FIG. 6(b) shows the relationship between gate voltage and common mode current observed when the two phases are turned on with a time difference. In the graph shown in the lower section of FIG. 6(b), the gate voltages denoted by the reference numerals 61 and 62 are shifted, and the semiconductor switching devices of the two phases are turned on with a time difference of about 0.4 µs when these gate voltages exceed the predetermined thresholds at different times, respectively. As shown in the upper section of FIG. 6(b), the peak value of the common mode current generated at this time is smaller than that in FIG. 6(a).

Comparing FIGS. 6(a) and 6(b), the peak value of the common mode current shown in FIG. 6(a) is about twice as high as the peak value of the common mode current shown in FIG. 6(b). This shows that the maximum value of the common mode noise current generated upon simultaneous two-phase turn-on is about twice as large as the maximum value of the common mode noise current obtained when the two phases are turned on with a time difference.

FIG. 6 shows that in order to reduce the common mode current, it is important to provide a difference in on timing by shifting the gate voltage from each other for the semiconductor switching in the two phases, thereby avoiding the occurrence of simultaneous two-phase turn-on.

Figure 7:
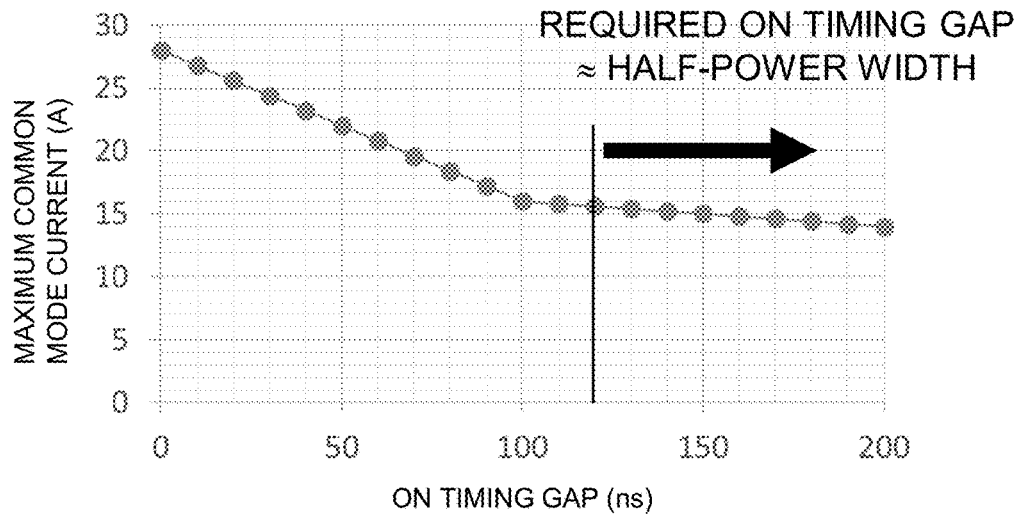
FIG. 7 is a diagram showing a relationship between the difference in timing when the semiconductor switching devices of the two phases are turned on and the maximum value of the common mode current.

FIG. 7 is a diagram showing a relationship between the difference in timing when the semiconductor switching devices of the two phases are turned on and the maximum value of the common mode current. As shown in FIG. 7, in the area where the ON timing difference is small, the maximum value of the common mode current decreases at an almost constant rate with respect to an increase in the ON timing difference, while with an on timing difference of above about 100 to 120 ns, the maximum value of the common mode current does not decrease much even if the on timing difference increases further.

FIG. 7 shows that an ON timing difference of 120 ns or more is sufficient to sufficiently reduce the common mode current. This is approximately equivalent to the half width of the peak waveform of the common mode current that occurs when the semiconductor switching device of one phase is turned on. In other words, the time difference corresponding to the half width of the peak waveform of the common mode current is the on timing difference required to suppress the common mode current (hereinafter referred to as "required on timing difference").

In the functional block diagram of the PWM arithmetic unit 105 shown in FIG. 4, the required shift calculation unit 1045 calculates the aforementioned required on timing difference as the time difference between the phases of the voltage command required to prevent the semiconductor switching devices of the inverter 30 from turning on simul-taneously in two phases. The required on timing difference can be calculated by measuring the half width of the peak waveform in the common mode current obtained when the semiconductor switching device of one phase is turned on, which has been obtained in advance by experiments or the like, and by maintaining the information indicating the measurement results in the inverter control apparatus 10, so that the required shift calculation unit 1045 can acquire the information. Alternatively, the required ON timing difference can be calculated using a predetermined formula or the like. Any other calculation method can be adopted in the required shift calculation unit 1045, as long as the required on timing difference can be calculated appropriately.

FIG. 8 is a diagram for explaining the relationship between the voltage command phase difference and gate voltage shift. FIG. 8(a) shows an example of the voltage command phase difference between two phases, and FIG. 8(b) shows the time shift of the gate voltage according to the phase difference. In FIG. 8(a), as in FIG. 5, the values of the voltage commands for each phase are shown as relative values normalized by a predetermined reference value.

In FIG. 8(a), for example, time point T1 is set near the timing when the two phase voltage command waveforms 81 and 82 overlap, and the difference between these voltage commands at this time point T1 is defined as a phase difference 83. In FIG. 8(b), the gate voltage waveforms 91 and 92 are examples of gate voltage waveforms corresponding to the values of the voltage command waveforms 81 and 82 at the time point T1 in FIG. 8(a). There is a time shift between these gate voltage waveforms 91 and 92 according to the phase difference 83. When the gate voltage waveforms 91 and 92 are input to the two-phase semiconductor switching devices respectively, the time shift according to this phase difference 83 becomes the on timing difference among the semiconductor switching devices.

Figure 9:
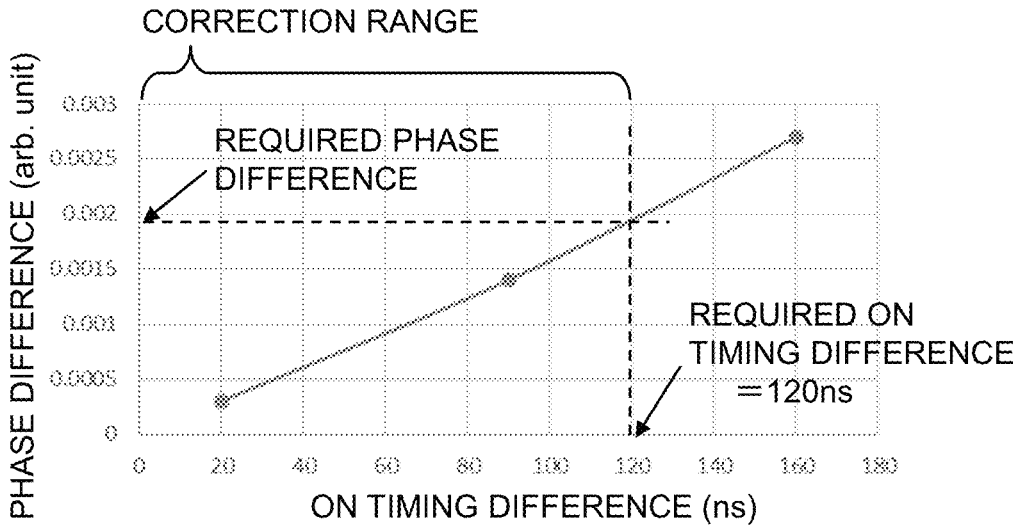
FIG. 9 is a diagram showing an example of the relationship between the on timing difference and phase difference among semiconductor switching devices.

FIG. 9 is a diagram showing an example of the relationship between the on timing difference and the phase difference among the semiconductor switching devices. As shown in FIG. 9, the on timing difference and the phase difference have an approximately proportional relationship. The phase difference values in FIG. 9 correspond to the relative values of the voltage commands of the phases in FIG. 8(a).

Thus, the on timing difference of each semiconductor switching device is determined according to the phase difference, which is the voltage difference between the voltage commands of the two phases. Therefore, the points 54 to 59 in FIG. 5 show that simultaneous two-phase turn-on can be prevented by setting the phase difference for the voltage command waveforms of any two of the phases U, V, and W which overlap such that the aforementioned required on timing difference is obtained at each timing where the voltage command waveforms of the two phases overlap.

In the functional block diagram of the PWM arithmetic unit 105 shown in FIG. 4, the required phase difference calculation unit 1046 determines the required phase difference, which represents the difference between the phases of the voltage command required to prevent the semiconductor switching devices of the inverter 30 from turning on simultaneously in two phases, according to the required on timing difference that has been calculated by the required shift calculation unit 1045. For example, in the example shown in FIG. 9, if the required on timing difference is 120 ns, the value of the required phase difference is determined to be approximately 0.002 as a value relative to the voltage command.

The method of correcting voltage commands with the voltage command correction unit 1047 will be explained below with reference to FIG. 10.

FIG. 10 is a diagram showing the relationship between voltage command correction and effect of suppression of common mode noise current according to the first embodiment of the present invention. FIG. 10(*a*) shows examples of voltage command waveforms before and after correction of the U-phase and W-phase voltage commands. In FIG. 10(*a*), the solid line waveforms denoted by the reference numerals 121 and 122 indicate the U- and W-phase voltage commands before correction by the voltage command correction unit 1047, respectively, and the dashed line waveforms denoted by the reference numerals 123 and 124 indicate the U- and W-phase voltage commands after correction obtained by correcting the waveforms 121 and 122, respectively, with the voltage command correction unit 1047. The waveforms 121 and 122 in FIG. 10(*a*) show an enlarged view of, out of the voltage command waveforms 51 and 53 in the phases U and W illustrated in FIG. 5, the vicinity of the point 54 where the semiconductor switching device Sup in the U-phase upper arm and the semiconductor switching device Swp in the W-phase upper arm are turned on simultaneously.

In FIG. 10(*a*), within the predetermined range before and after the point 54, the difference between the voltage command waveforms 121 and 122 of the U and W phases before correction generated by the voltage command generating unit 1040 is smaller than the required phase difference 126 calculated by the phase difference calculation unit 1046. For this reason, the voltage command correction unit 1047 sets this range as a correction range 125 and corrects the voltage command waveforms 121 and 122 so that a difference equivalent to the required phase difference 126 within the correction range 125 is ensured between the voltage command waveforms 121 and 122.

To be specific, as shown in FIG. 10(*a*), the voltage command correction unit 1047 sets the lower command value 127 and upper command value 128 with the same gap as the required phase difference 126 centered at the point 54 with respect to the correction range 125. These values are then corrected so that the lower and higher of the voltage command waveforms 121 and 122 before correction match the lower command value 127 and the upper command value 128, respectively. This allows these values to be calculated so that the voltage difference between the corrected U- and W-phase voltage command waveforms 123 and 124 matches the required phase difference 126.

Since the area around the point 54 is enlarged in FIG. 10(*a*), the correction range 125 is only a small period of time in the entire voltage command waveform. Therefore, correcting the voltage command waveforms 121 and 122 as described above has almost no impact on the drive of the motor 300.

Although FIG. 10(*a*) shows an example of correction of the U-phase voltage command and W-phase voltage command, the values of the voltage commands for the phases can be corrected in the same way for other combinations of two phases, so that the voltage difference between the phases matches the required phase difference.

FIG. 10(*b*) shows an example of the common mode noise current generated when each semiconductor switching device of the inverter 30 is turned on and off with the PWM signal generated by the PWM signal generation unit 1049 shown in FIG. 4, using the corrected voltage command waveforms 123 and 124 shown in FIG. 10(*a*). FIG. 10(*b*) shows that the common mode noise current is suppressed to the same extent as in other periods of time within the correction range 125, using the voltage command that has been corrected by the voltage command correction unit 1047.

The effect of suppression of the common mode noise current by the voltage command correction performed by the voltage command correction unit 1047 is higher at lower torque and rotational speed of the motor 300. This will be explained below with reference to FIG. 11.

FIG. 11 is a diagram showing the relationship between the running state of an electric vehicle and common mode noise current. FIG. 11(*a*) shows an example of the relationship between the common mode current and the U-phase voltage command and V-phase voltage command in the case where the electric vehicle equipped with the motor drive system 1 according to this embodiment is running at high speed. When the electric vehicle is running at high speed as shown in FIG. 11(*a*), the motor 300 in the motor drive system 1 is in a high-torque and high-revolution state. Meanwhile, FIG. 11(*b*) shows an example of the relationship between the common mode current and the U-phase voltage command and V-phase voltage command in the case where the electric vehicle equipped with the motor drive system 1 according to this embodiment is running at low speed like creep driving. When the electric vehicle is running at low speed, as in the case of creep driving in FIG. 11(*b*), the motor 300 in the motor drive system 1 is in a low-torque and low-revolution state.

Comparing FIG. 11(*a*) and FIG. 11(*b*), the tilt of the change in the U- and V-phase voltage commands is smaller in FIG. 11(*b*) than in FIG. 11(*a*). Therefore, the period of time when the voltage difference between these voltage commands is smaller than the required phase difference is relatively longer, and accordingly, the period of time when the common mode noise current doubles is also longer. This shows that the case of FIG. 11(*b*) is more effective in suppressing the common mode noise current by voltage command correction performed by the voltage command correction unit 1047.

According to the first embodiment of the present invention described above, the following effects are achieved.

(1) The inverter control apparatus 10 is an apparatus that controls the inverter 30 having a plurality of semiconductor switching devices and converting DC power into multi-phase AC power by switching the plurality of semiconductor switching devices separately. In the PWM arithmetic unit 105, the inverter control apparatus 10 includes the voltage command generating unit 1040 that generates a voltage command corresponding to each phase of AC power; the phase difference calculation unit 1044 that calculates the voltage difference between the phases of the voltage command; the required phase difference calculation unit 1046 that calculates the required phase difference, which represents the difference of voltages between the phases of the voltage command required to prevent the semiconductor switching devices from turning on simultaneously in two phases; the voltage command correction unit 1047 that compares the voltage difference calculated by the phase difference calculation unit 1044 and the required phase difference calculated by the required phase difference calculation unit 1046, and corrects the voltage command based on the comparison result; the carrier wave generating unit 1048 that generates carrier waves; and the PWM signal generating unit 1049 that compares the voltage command that has been corrected by the voltage command correction unit 1047 with the carrier wave, thereby generating a PWM signal used to control the inverter 30. In this way, the noise current generated in the power conversion apparatus 100 can be effectively suppressed.

(2) As shown in FIG. 10, if the voltage difference between the phases of the voltage command is smaller than the required phase difference, the voltage command correction unit 1047 corrects the voltage command so that the voltage difference between the phases and the required phase difference substantially match. In this way, simultaneous two-phase turn-on at each timing when the voltage command waveforms of any two of the phases U, V, and W overlap can be reliably avoided and the common mode noise current can be suppressed.

(3) The inverter control apparatus 10 includes, in the PWM arithmetic unit 105, the required shift calculation unit 1045 that calculates the time difference between the phases of the voltage command required to prevent the semiconductor switching devices from turning on simultaneously in two phases. The required phase difference calculation unit 1046 calculates the required phase difference based on the time difference calculated by the required shift calculation unit 1045. In this way, the required phase difference, which represents the difference in voltage between the phases of the voltage command required for the semiconductor switching devices not to be turned on simultaneously in two phases, can be easily and reliably calculated in the required phase difference calculation unit 1046.

(4) The required shift calculation unit 1045 calculates the time difference between the phases based on the half-width of the peak waveform of the common mode current flowing in the inverter 30 when the semiconductor switching device of one phase is turned on. In this way, the time difference between the phases of the voltage command required to prevent the semiconductor switching devices from turning on simultaneously in two phases can be accurately calculated.

Second Embodiment

The second embodiment of the present invention will now be described. This embodiment describes an example in which the common mode noise current is further suppressed by correcting the frequency of the carrier wave used to generate the PWM signal when correcting the voltage command according to the required phase difference.

The inverter control apparatus of this embodiment has almost the same configuration as the inverter control apparatus 10 of the first embodiment shown in FIG. 3. However, the PWM arithmetic unit 105 of FIG. 3 is replaced by the PWM arithmetic unit 105A which has a different functional configuration in this embodiment. For this reason, the inverter control apparatus of this embodiment will hereinafter be referred to as "inverter control apparatus 10A".

Figure 12:
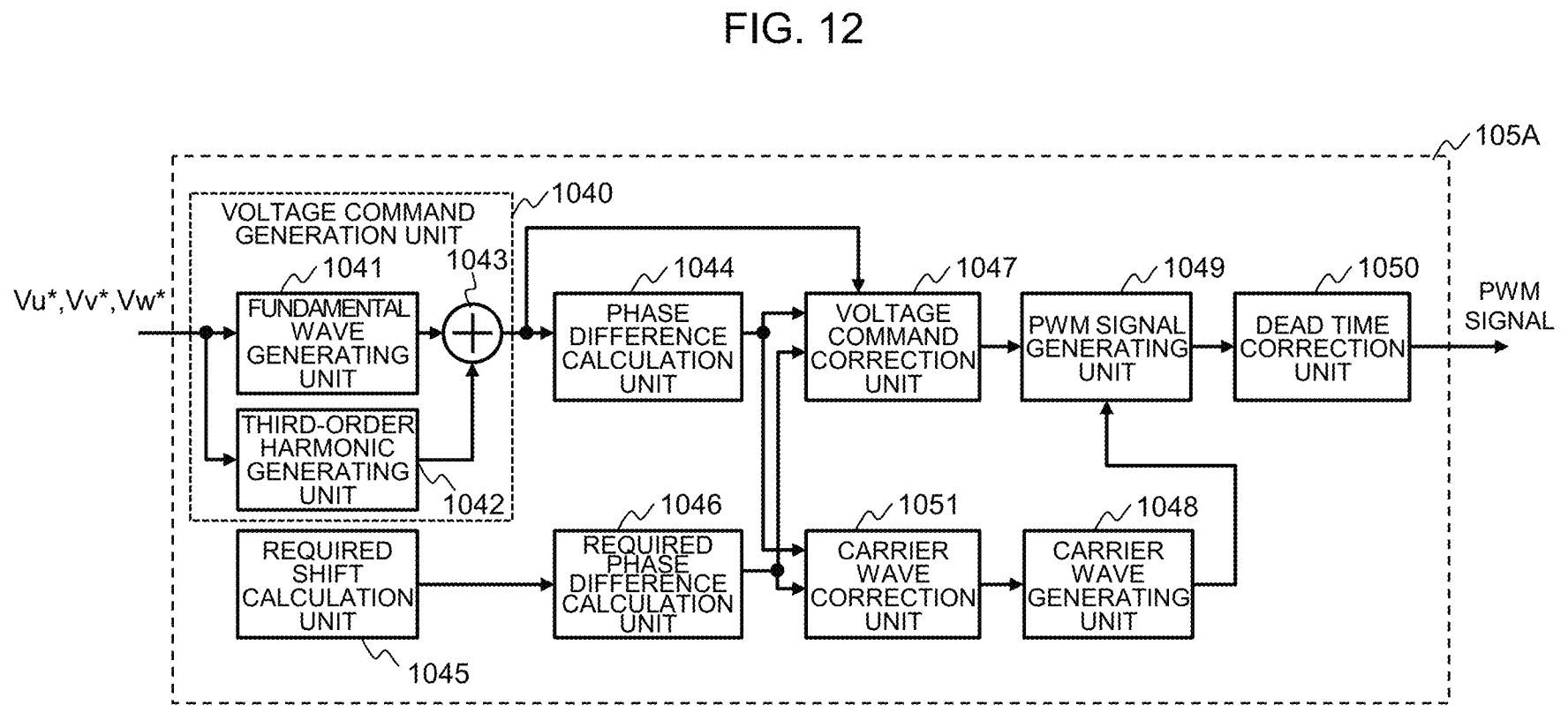

FIG. 12 is a functional block diagram of the PWM arithmetic unit 105A according to the second embodiment of the present invention. The PWM arithmetic unit 105A of this embodiment differs from the PWM arithmetic unit 105 of FIG. 4 described in the first embodiment in that it has an additional carrier wave correction unit 1051.

The carrier wave correction unit 1051 compares the voltage difference between the phases U, V, and W of the voltage command calculated by the phase difference calculation unit 1044 with the required phase difference calculated by the required phase difference calculation unit 1046, and based on the comparison result, corrects the frequency of the carrier wave generated by the carrier wave generating unit 1048. Here, as in the case where the voltage command correction unit 1047 corrects the voltage command, the frequency of the carrier wave is corrected so that the corrected frequency is lower than the frequency before correction if the voltage difference between the phases of the voltage command is smaller than the required phase difference. In this case, the frequency may be switched in a step-like manner before and after the correction, or the frequency may be changed gradually.

The carrier wave generating unit 1048 generates a carrier wave according to the frequency corrected by the carrier wave correction unit 1051 and outputs it to the PWM signal generating unit 1049.

In this way, the frequency of the carrier wave used to generate the PWM signal can be lowered during the period when the voltage command is corrected, thereby lowering the frequency of the PWM signal. Therefore, it is possible to further suppress the occurrence of common mode noise current due to the turning on and off of semiconductor switching devices performed in response to the output of the PWM signal.

FIG. 13 is a diagram showing the relationship between voltage command correction and the effect of suppression of common mode noise current according to the second embodiment of the present invention. FIG. 13(*a*) shows examples of voltage command waveforms before and after correction of the U-phase voltage command and W-phase voltage command, and is similar to FIG. 10(*a*) described in the first embodiment. In other words, in FIG. 13(*a*), the solid waveforms denoted by the reference numerals 141 and 142 represent the U- and W-phase voltage commands before correction by the voltage command correction unit 1047, respectively, and the dashed waveforms denoted by the reference numerals 143 and 144 represent the corrected U- and W-phase voltage commands obtained by correcting the waveforms 141 and 142 by the voltage command correction unit 1047, respectively. The correction range 145 is set for the section where the difference between the voltage command waveforms 141 and 142 before and after the point 54 is smaller than the required phase difference 146, and over this correction range 145, with the same gap as the required phase difference 146 centered at the point 54, the lower command value 147 and upper command value 148 for the corrected voltage command waveforms 143 and 144 are set.

FIG. 13(*b*) shows an example of the common mode noise current generated when each semiconductor switching device of the inverter 30 is turned on and off through the PWM signal generated by the PWM signal generation unit 1049 in FIG. 12, using the corrected voltage command waveforms 143 and 144 shown in FIG. 13(*a*). FIG. 13(*b*) shows that because the PWM signal is generated using the carrier wave generated by the carrier wave generating unit 1048 at the frequency corrected by the carrier wave correction unit 1051, the occurrence of the common mode noise current in the correction range 145 is more suppressed than in FIG. 10(*b*) that has been described in the first embodiment.

According to the second embodiment of the present invention described above, the inverter control apparatus 10A includes, in the PWM arithmetic unit 105A, the carrier wave correction unit 1051 that compares the voltage difference calculated by the phase difference calculation unit 1044 and the required phase difference calculated by the required phase difference calculation unit 1046 and corrects the frequency of the carrier wave based on the comparison result. To be specific, if the voltage difference between the phases of the voltage command is smaller than the required phase difference, the carrier wave correction unit 1051 corrects the frequency of the carrier wave so that it becomes lower than that before correction. The carrier wave generating unit 1048 generates the carrier wave at the frequency that has been corrected by the carrier wave correction unit 1051. In this way, the noise current that occurs in the power conversion apparatus 100 can be suppressed more effectively.

Although each of the aforementioned embodiments describes a stand-alone inverter control apparatus, the present invention can be applied to an inverter apparatus in which an inverter control apparatus and an inverter are integrated, or to a motor drive system in which an inverter apparatus and a motor are integrated, as long as it features the aforementioned functions.

The present invention is not limited to the aforementioned embodiments, and various modifications can be made without departing from the scope of the present invention.

REFERENCE SIGNS LIST

10: Inverter control apparatus, 20: Gate drive circuit, 30: Inverter, 40: Noise filter, 50: Smoothing capacitor, 60: Enclosure, 100: Power conversion apparatus, 101: Torque command generation unit, 102: Current command generation unit, 103: Current control unit, 104: dq/three-phase voltage conversion unit, 105, 105A: PWM arithmetic unit, 106: Rotational position arithmetic unit, 107: Motor speed arithmetic unit, 108, 109: Phase compensation unit, 110: Three-phase current arithmetic unit, 111: Three-phase/dq current conversion unit, 1040: Voltage command generating unit, 1041: Fundamental wave generating unit, 1042: Third-order harmonic generating unit, 1043: Adder unit, 1044: Phase difference calculation unit, 1045: Required shift calculation unit, 1046: Required phase difference calculation unit, 1047: Voltage command correction unit, 1048: Carrier wave generating unit, 1049: PWM signal generating unit, 1050: Dead time correction unit, 1051: Carrier wave correction unit, 200: Power source, 300: Motor, 301: Rotational position sensor, 302: Current sensor

The invention claimed is:

1. An inverter control apparatus that controls an inverter having a plurality of semiconductor switching devices and converting DC power into multi-phase AC power by switching the plurality of semiconductor switching devices separately, the apparatus comprising:

a voltage command generating unit that generates a voltage command corresponding to each phase of the AC power;

a phase difference calculation unit that calculates respective voltage differences between the voltage commands of each phase;

a required phase difference calculation unit that calculates a required phase difference, which represents a difference of voltages between the phases of the voltage command required to prevent the semiconductor switching devices from turning on simultaneously in two phases;

a voltage command correction unit that compares each of the voltage differences calculated by the phase difference calculation unit with the required phase difference calculated by the required phase difference calculation unit, and corrects the voltage command based on the comparison result;

a carrier wave generating unit that generates a carrier wave; and a PWM signal generating unit that compares one or more of the voltage commands that have been corrected by the voltage command correction unit with the carrier wave, thereby generating a PWM signal used to control the inverter.

2. The inverter control apparatus according to claim 1, wherein if a voltage difference, among the voltage differences, is smaller than the required phase difference, the voltage command correction unit corrects the voltage command so that the voltage difference and the required phase difference substantially match.

3. The inverter control apparatus according to claim 1, further comprising:

a carrier wave correction unit that compares the voltage difference calculated by the phase difference calculation unit with the required phase difference calculated by the required phase difference calculation unit, and corrects a frequency of the carrier wave based on the result of the comparison, wherein the carrier wave generating unit generates the carrier wave at the frequency that has been corrected by the carrier wave correction unit.

4. The inverter control apparatus according to claim 3, wherein if the voltage difference is smaller than the required phase difference, the carrier wave correction unit corrects the frequency of the carrier wave so that the frequency of the carrier wave becomes lower than the frequency before the correction.

5. The inverter control apparatus according to claim 1, further comprising:

a required shift calculation unit that calculates a time difference between the phases of the voltage command required to prevent the semiconductor switching devices from turning on simultaneously in two phases, wherein the required phase difference calculation unit calculates the required phase difference based on the time difference calculated by the required shift calculation unit.

6. The inverter control apparatus according to claim 5, wherein the required shift calculation unit calculates the time difference based on a half-width of a peak waveform of common mode current flowing in the inverter when the semiconductor switching device of one phase is turned on.

7. A power conversion apparatus comprising:

the inverter control apparatus according to claim 1;

the inverter controlled by the inverter control apparatus; and a smoothing capacitor that smooths the DC power input from a power source to the inverter.

* * * * *